(12) United States Patent
Ding et al.

(10) Patent No.: US 11,398,106 B2
(45) Date of Patent: Jul. 26, 2022

(54) ULTRASONIC SENSOR PIXEL CIRCUIT, DRIVING METHOD THEREOF AND DISPLAY PANEL

(71) Applicant: BOE Technology Group Co., Ltd., Beijing (CN)

(72) Inventors: Xiaoliang Ding, Beijing (CN); Haisheng Wang, Beijing (CN); Yingming Liu, Beijing (CN); Bo Chen, Beijing (CN); Pengpeng Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 79 days.

(21) Appl. No.: 16/964,192

(22) PCT Filed: Feb. 5, 2020

(86) PCT No.: PCT/CN2020/074356
§ 371 (c)(1),
(2) Date: Jul. 22, 2020

(87) PCT Pub. No.: WO2020/199748
PCT Pub. Date: Oct. 8, 2020

(65) Prior Publication Data
US 2021/0232789 A1 Jul. 29, 2021

(30) Foreign Application Priority Data

Apr. 2, 2019 (CN) .......................... 201910261333.2

(51) Int. Cl.
*G06V 40/13* (2022.01)
*G01S 15/89* (2006.01)
(Continued)

(52) U.S. Cl.
CPC ...... *G06V 40/1306* (2022.01); *G01S 15/8906* (2013.01); *G06V 10/147* (2022.01); *G06V 40/1359* (2022.01)

(58) Field of Classification Search
CPC .... G06K 9/0002; G06K 9/209; G06K 9/0008; G01S 15/8906; G01S 7/52079;
(Continued)

(56) References Cited

U.S. PATENT DOCUMENTS

2014/0198072 A1* 7/2014 Schuele ................. G06F 3/043
345/174
2017/0059699 A1 3/2017 Mathe et al.
(Continued)

FOREIGN PATENT DOCUMENTS

CN 106896963 A 6/2017
CN 107923969 A 4/2018
(Continued)

OTHER PUBLICATIONS

Office Action dated Aug. 24, 2020 for Chinese Patent Application No. 201910261333.2 and English Translation.
(Continued)

*Primary Examiner* — Abhishek Sarma
(74) *Attorney, Agent, or Firm* — Ling Wu; Stephen Yang; Ling and Yang Intellectual Property (57) ABSTRACT

The present disclosure provides an ultrasonic sensor pixel circuit, a driving method thereof and a display panel. The ultrasonic sensor pixel circuit includes a detection module, of which a first terminal is connected with an ultrasonic sensing unit and a second terminal is connected with a first signal terminal, and the detection module is configured to generate a detection voltage according to an electric signal output from the ultrasonic sensing unit under control of the first signal terminal; an output module, of which a first
(Continued)

terminal is connected with a third terminal of the detection module and a second terminal is connected with a read line, and the output module is configured to generate an output signal according to the detection voltage and provide the output signal to the read line.

18 Claims, 6 Drawing Sheets

(51) Int. Cl.
 *G06V 10/147* (2022.01)
 *G06V 40/12* (2022.01)
(58) Field of Classification Search
 CPC ............. G06V 40/1306; G06V 10/147; G06V 40/1359; B06B 2201/55; B06B 2201/70; B06B 1/0215
 See application file for complete search history.

(56) References Cited

U.S. PATENT DOCUMENTS

| | | |
|---|---|---|
| 2017/0079624 A1 | 3/2017 | Wadhwa et al. |
| 2017/0090028 A1 | 3/2017 | Djordjev et al. |
| 2017/0110504 A1 | 4/2017 | Panchawagh et al. |
| 2017/0285877 A1 | 10/2017 | Hinger |
| 2019/0392188 A1 | 12/2019 | Wang et al. |
| 2020/0050322 A1 | 2/2020 | Liu et al. |

FOREIGN PATENT DOCUMENTS

| | | |
|---|---|---|
| CN | 108027879 A | 5/2018 |
| CN | 108140106 A | 6/2018 |
| CN | 108140115 A | 6/2018 |
| CN | 108682386 A | 10/2018 |
| CN | 108806587 A | 11/2018 |
| CN | 108875637 A | 11/2018 |
| CN | 108883435 A | 11/2018 |
| CN | 110008897 A | 7/2019 |
| WO | 2014108960 A1 | 7/2014 |

OTHER PUBLICATIONS

International Search Report for PCT/CN2020/074356 dated Apr. 26, 2020.

* cited by examiner

ULTRASONIC SENSOR PIXEL CIRCUIT, DRIVING METHOD THEREOF AND DISPLAY PANEL

CROSS-REFERENCE TO RELATED APPLICATIONS

The present application is a U.S. National Phase Entry of International Application No. PCT/CN2020/074356 having an international filing date of Feb. 5, 2020, which is based on and claims priority to the Chinese patent application No. 201910261333.2, filed on Apr. 2, 2019. The above-identified applications are hereby incorporated by reference in their entirety.

TECHNICAL FIELD

The present disclosure relates to the technical field of display, in particular to an ultrasonic sensor pixel circuit, a driving method thereof and a display panel.

BACKGROUND

At present, some fingerprint recognitions are realized based on an ultrasonic technology, of which a main principle is that when transmitted waves contact an object such as a finger, vibration intensities of reflected waves are different since there are valleys and ridges on the finger, and thus positions of the valleys and ridges may be determined by detecting the vibration intensities of the reflected waves, thereby realizing fingerprint recognition.

In the related art, fingerprint recognition is usually realized by detecting a half wave of the reflected wave. However, a problem in the related art is that precision of fingerprint recognition is low.

SUMMARY

The present disclosure is intended to solve one of the technical problems in the related art at least to a certain extent.

For this purpose, a first objective of the present disclosure is to provide an ultrasonic sensor pixel circuit to detect a full amplitude of an ultrasonic echo signal.

A second objective of the present disclosure is to provide a display panel.

A third objective of the present disclosure is to provide a driving method of an ultrasonic sensor pixel circuit.

To achieve the above objectives, an implementation in a first aspect of the present disclosure provides an ultrasonic sensor pixel circuit. The ultrasonic sensor pixel circuit includes a detection module and an output module. A first terminal of the detection module is connected with an ultrasonic sensing unit, a second terminal of the detection module is connected with a first signal terminal, and the detection module is configured to generate a detection voltage according to an electric signal output from the ultrasonic sensing unit under control of the first signal terminal, wherein the electric signal is generated according to an ultrasonic signal which is fed back by a finger and received by the ultrasonic sensing unit. A first terminal of the output module is connected with a third terminal of the detection module, a second terminal of the output module is connected with a read line, and the output module is configured to generate an output signal according to the detection voltage and provide the output signal to the read line.

According to the ultrasonic sensor pixel circuit provided in the implementation of the present disclosure, the detection module generates the detection voltage according to the electrical signal output from the ultrasonic sensing unit under the control of the first signal terminal, and then the output module generates the output signal according to the detection voltage and provides the output signal to the read line.

According to an implementation of the present disclosure, the detection module includes a pull-up unit and a potential hold unit. The pull-up unit is connected with the ultrasonic sensing unit and the first signal terminal, and the pull-up unit is configured to superpose the electric signal output from the ultrasonic sensing unit on a second potential under the control of the first signal terminal, to enable a trough potential of the electric signal to be at the second potential. The potential hold unit is connected with the pull-up unit, the potential hold unit is configured to generate the detection voltage according to an electrical signal superposed on the second potential, wherein the detection voltage is a sum of the second potential and a peak-to-peak value of the electrical signal.

According to an implementation of the present disclosure, the pull-up unit includes a first diode, an anode of the first diode is connected with the first signal terminal, and a cathode of the first diode is connected with the ultrasonic sensing unit.

According to an implementation of the present disclosure, the potential hold unit includes a second diode, an anode of the second diode is connected with the cathode of the first diode, and a cathode of the second diode serves as the third terminal of the detection module.

According to an implementation of the present disclosure, the ultrasonic sensor pixel circuit further includes an ultrasonic transmission control module connected with the ultrasonic sensing unit and a transmission control terminal, wherein the ultrasonic transmission control module provides a first potential to the ultrasonic sensing unit under control of the transmission control terminal.

According to an implementation of the present disclosure, the ultrasonic sensor pixel circuit further includes a reset module connected with the third terminal of the detection module and a reset terminal, wherein the reset module sets the third terminal of the detection module to a second potential under control of the reset terminal.

According to an implementation of the present disclosure, the ultrasonic transmission control module includes a first transistor, wherein a first electrode of the first transistor is connected with the ultrasonic sensing unit, a second electrode of the first transistor is connected with the first signal terminal, and a control electrode of the first transistor is connected with the transmission control terminal.

According to an implementation of the present disclosure, the output module includes a driving unit that generates the output signal according to the detection voltage, wherein the driving unit includes a second transistor, a first electrode of the second transistor is connected with a first power supply, a second electrode of the second transistor is connected with the read line, and a control electrode of the second transistor is connected with the third terminal of the detection module.

According to an implementation of the present disclosure, the output module further includes a read unit located between and connected with the driving unit and the read line, the read unit is further connected with a read terminal, and the read unit is configured to provide the output signal to the read line under control of the read terminal, wherein the read unit includes a third transistor, a first electrode of the third transistor is connected with the second electrode of the second transistor, a second electrode of the third transistor is connected with the read line, and a control electrode of the third transistor is connected with the read terminal.

According to an implementation of the present disclosure, the reset module includes a fourth transistor, wherein a first electrode of the fourth transistor is connected with a second signal terminal, a second electrode of the fourth transistor is connected with the third terminal of the detection module, and a control electrode of the fourth transistor is connected with the reset terminal.

To achieve the above objectives, an implementation in a second aspect of the present disclosure provides a display panel, which includes a plurality of ultrasonic sensor pixel circuits as described in the implementations in the first aspect of the present disclosure.

According to an implementation of the present disclosure, a plurality of ultrasonic sensor pixel circuits are integrated and arranged in a pixel circuit layer of the display panel, or a plurality of ultrasonic sensor pixel circuits are arranged below the pixel circuit layer of the display panel.

To achieve the above objectives, an implementation in a third aspect of the present disclosure provides a driving method of an ultrasonic sensor pixel circuit, which includes the following acts: in a first detection stage, generating a detection voltage according to an electrical signal output from an ultrasonic sensing unit; wherein the electric signal is generated according to an ultrasonic signal which is fed back by a finger and received by the ultrasonic sensing unit; and in a second detection stage, generating an output signal according to the detection voltage, and providing the output signal to a read line.

According to the driving method of the ultrasonic sensor pixel circuit provided in the implementation of the present disclosure, first the detection voltage is generated according to the electrical signal output from the ultrasonic sensing unit, and then the output signal is generated according to the detection voltage and provided to the read line.

According to an implementation of the present disclosure, before the first detection stage, the method further includes: in a third detection stage, setting a third terminal of a detection module to a second potential, wherein the third terminal of the detection module is configured to provide the detection voltage.

According to an implementation of the present disclosure, before the first detection stage, the method further includes: in an ultrasonic transmission stage, providing a first potential to the ultrasonic sensing unit; and after the second detection stage, the method further includes: in a reset stage, setting a third terminal of a detection module to a second potential, wherein the third terminal of the detection module is configured to provide the detection voltage.

Additional aspects and advantages of implementations of the present disclosure will be given in part in the following descriptions, become apparent in part from the following descriptions, or be learned from practice of the present disclosure.

BRIEF DESCRIPTION OF DRAWINGS

The above and/or additional aspects and advantages of the present disclosure will become apparent and easy to understand from the following description of implementations in conjunction with accompanying drawings.

DETAILED DESCRIPTION

Descriptions will now be made in detail to implementations, examples of which are illustrated in the accompanying drawings. The same or similar elements and the elements having same or similar functions are denoted by like reference numerals throughout the descriptions. The implementations described herein with reference to the accompanying drawings are exemplary, and intend to be used for explaining the present disclosure, which should not be construed to limit the present disclosure.

An ultrasonic sensor pixel circuit, a driving method thereof, and a display panel according to implementations of the present disclosure will be described below with reference to the accompanying drawings.

Figure 1:
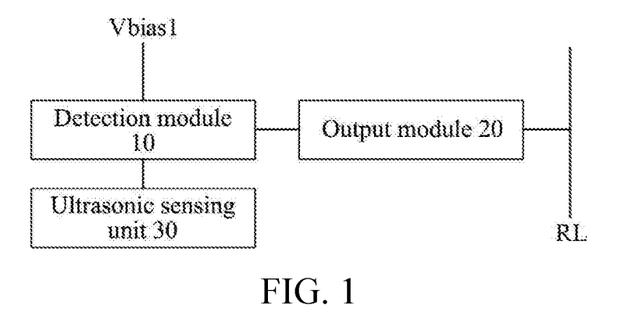
FIG. 1 is a schematic block diagram of an ultrasonic sensor pixel circuit according to an implementation of the present disclosure.

FIG. 1 is a schematic block diagram of an ultrasonic sensor pixel circuit according to an implementation of the present disclosure. As shown in FIG. 1, the ultrasonic sensor pixel circuit in the implementation of the present disclosure includes a detection module 10 and an output module 20.

A first terminal of the detection module 10 is connected with an ultrasonic sensing unit 30, and a second terminal of the detection module 10 is connected with a first signal terminal Vbias1. The detection module 10 is configured to generate a detection voltage according to an electric signal output from the ultrasonic sensing unit 30 under control of the first signal terminal Vbias1, herein the electric signal is generated according to an ultrasonic signal which is fed back by a finger and received by the ultrasonic sensing unit 30.

Figure 4:
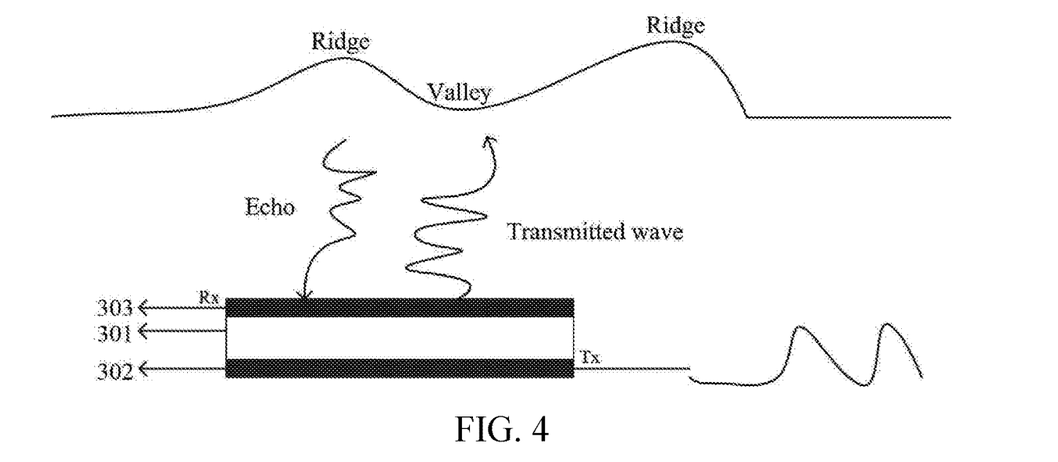
FIG. 4 is a schematic diagram of a working principle of an ultrasonic sensing unit in an ultrasonic sensor pixel circuit according to an implementation of the present disclosure.

It needs to be noted that, as shown in FIG. 4, the ultrasonic sensing unit 30 may adopt a piezoelectric sandwich structure. For example, the ultrasonic sensing unit 30 may include a piezoelectric component PVDF, a first electrode (or referred to as a cathode) TX and a second electrode (or referred to as an anode) RX, and the piezoelectric component PVDF is arranged between the first electrode TX and the second electrode RX. When ultrasonic fingerprint recognition is performed, a sine wave signal such as a high-voltage sine wave signal, may be provided to the first electrode TX while a fixed voltage is provided to the second electrode RX, so that the piezoelectric component PVDF generates an inverse piezoelectric effect to transmit ultrasonic waves outwards due to voltage excitation. The transmitted waves are reflected when contacting an object such as a finger. Since there are valleys and ridges on finger fingerprint, vibration intensities of echoes are different. At this time, the high-voltage sine wave signal is stopped being provided to the first electrode TX, and instead a fixed voltage is provided to the first electrode TX. The piezoelectric component PVDF is affected by echoes fed back through the finger, and an alternating current signal is generated on the second electrode RX due to the positive piezoelectric effect. Positions of valleys and ridges on the finger may be determined by measuring an amplitude of the alternating current signal, thus realizing ultrasonic fingerprint recognition.

Figure 2:
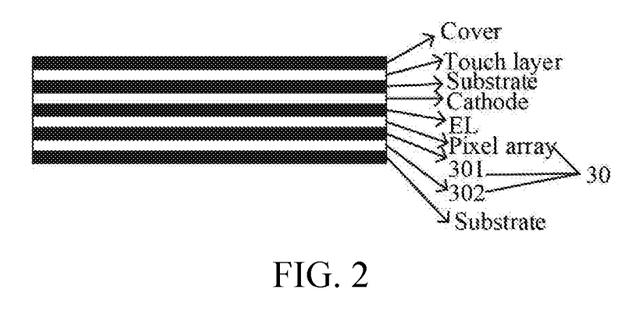
FIG. 2 is a schematic diagram of a position of an ultrasonic sensing unit in an ultrasonic sensor pixel circuit according to an implementation of the present disclosure.
Figure 3:
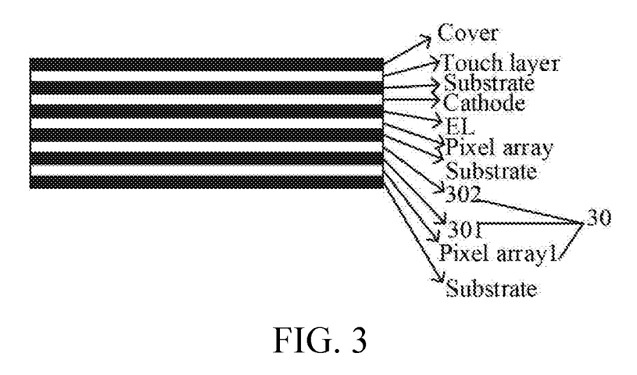
FIG. 3 is a schematic diagram of a position of an ultrasonic sensing unit in an ultrasonic sensor pixel circuit according to another implementation of the present disclosure.

It should be understood that an ultrasonic sensing structure may be constructed by P×Q ultrasonic sensing units 30, i.e., the ultrasonic sensing structure has P rows and Q columns of ultrasonic sensing units 30. As shown in FIGS. 2-4, the piezoelectric components PVDFs in the P rows and Q columns of ultrasonic sensing units 30 may form a piezoelectric layer 301 of the ultrasonic sensing structure, the first electrodes TX may form a TX layer 302 of the ultrasonic sensing structure, and the second electrodes RX may form an RX layer 303 of the ultrasonic sensing structure. Herein, the piezoelectric layer 301 is located between the TX layer 302 and the RX layer 303, i.e., the TX layer 302 and the RX layer 303 are respectively arranged on either side of the piezoelectric layer 301.

The ultrasonic sensing structure may be combined with a display panel such as an OLED (organic light-emitting display) display panel. As an example, a stacked structure with higher integration as shown in FIG. 2 may be adopted. Specifically, the ultrasonic sensing structure and the ultrasonic sensor pixel circuit are added to a display module. In other words, the ultrasonic sensor pixel circuit and the RX layer 303 of the ultrasonic sensing structure may be integrated and arranged in a pixel circuit layer (i.e., a pixel array layer) of the display module, i.e., the pixel array layer in FIG. 2 may not only serve as the pixel circuit layer for display, but also have an ultrasonic sensor pixel circuit for ultrasonic fingerprint recognition, while the piezoelectric layer 301 and TX layer 302 of the ultrasonic sensing structure may be arranged below the pixel array layer. As another example, a structure with lower integration as shown in FIG. 3 may also be adopted. Specifically, the ultrasonic sensing structure and the ultrasonic sensor pixel circuit are arranged below the display module, for example, the ultrasonic sensing structure and the ultrasonic sensor pixel circuit are arranged below the display module in an external hanging manner. In other words, a display pixel circuit is arranged on the pixel array layer, i.e., the pixel array layer in FIG. 3 serves as a pixel circuit layer for display, while the ultrasonic sensor pixel circuit and RX layer 303 of the ultrasonic sensing structure are independently arranged on a pixel array1 layer, that is, the pixel array1 layer in FIG. 3 serves as a pixel circuit layer for ultrasonic fingerprint recognition, and the piezoelectric layer 301 and TX layer 302 of the ultrasonic sensing structure may be arranged above the pixel array1 layer.

It needs to be further noted that the electrical signal output from the ultrasonic sensing unit 30 may be a sinusoidal electrical signal.

As shown in FIG. 1, a first terminal of the output module 20 is connected with a third terminal of the detection module 10, a second terminal of the output module 20 is connected with a read line RL, and the output module 20 is configured to generate an output signal according to a detection voltage and provide the output signal to the read line RL.

The read line RL is further connected with an external detection circuit, and the output signal may be sent to the external detection circuit through the read line RL, and the external detection circuit may determine valleys or ridges of the finger fingerprint according to a received output signal.

It needs to be noted that the output signal may indicate intensities and magnitudes of ultrasonic waves which are reflected by a finger and incident on the ultrasonic sensing unit 30.

It should be understood that under control of the first signal terminal Vbias1, the detection module 10 generates the detection voltage according to the electrical signal, such as a sinusoidal electrical signal, output from the ultrasonic sensing unit 30, and then the output module 20 generates the output signal according to the detection voltage, and provides the output signal to the read line RL to read the output signal. Thus, by detecting a peak-to-peak value of an ultrasonic signal fed back by a finger, high-precision ultrasonic fingerprint recognition may be realized.

Specifically, detection of the output signal of the aforementioned ultrasonic sensor pixel circuit mainly includes two detection stages.

In a first detection stage, a detection voltage is generated according to an electrical signal output from the ultrasonic sensing unit 30, wherein the electric signal is generated according to an ultrasonic signal which is fed back by a finger and received by the ultrasonic sensing unit 30.

In a second detection stage, an output signal is generated according to the detection voltage, and is provided to the read line RL.

That is, in the first detection stage, under the control of the first signal terminal Vbias1, the detection module 10 generates the detection voltage according to the electrical signal, such as a sine wave signal, output from the ultrasonic sensing unit 30, and then, in the second detection stage, the output module 20 generates the output signal according to the detection voltage generated by the detection module 10 and provides the output signal to the read line RL, thus realizing high-precision ultrasonic fingerprint recognition.

Figure 5:
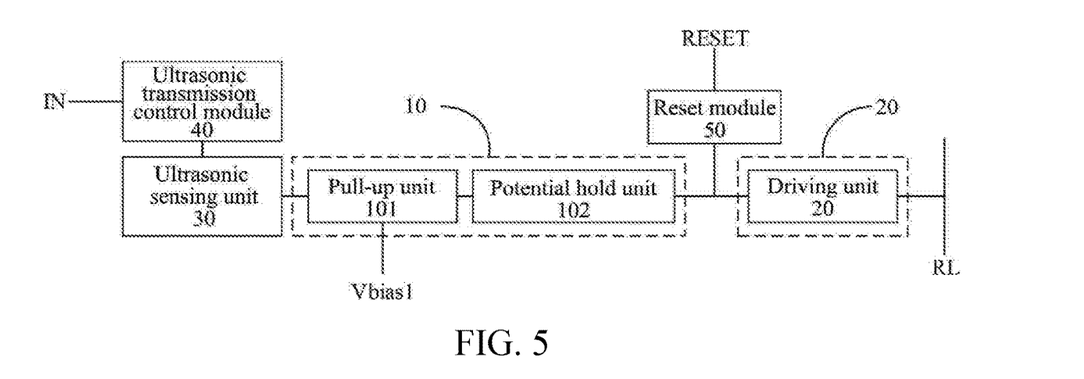
FIG. 5 is a schematic block diagram of an ultrasonic sensor pixel circuit according to an implementation of the present disclosure.
Figure 6:
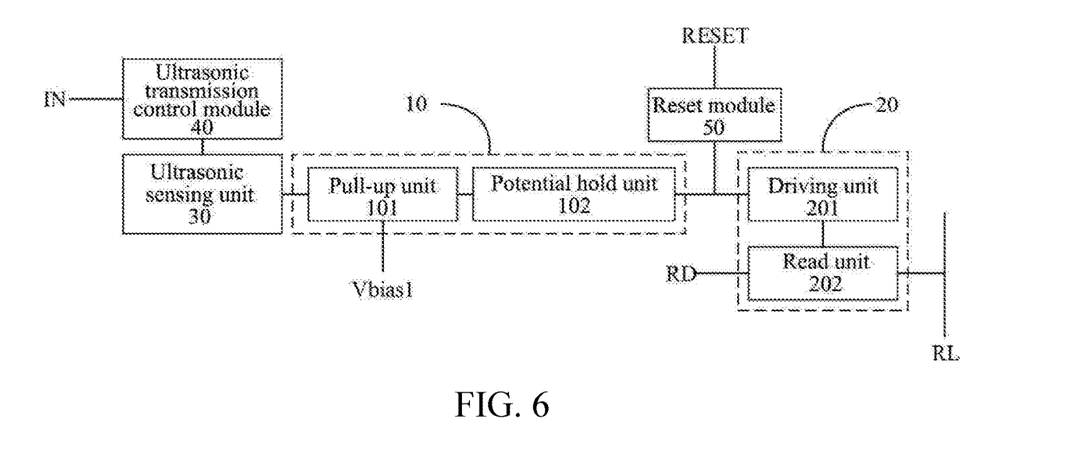
FIG. 6 is a schematic block diagram of an ultrasonic sensor pixel circuit according to another implementation of the present disclosure.

Specifically, according to an implementation of the present disclosure, as shown in FIGS. 5-6, the detection module 10 includes a pull-up unit 101 and a potential hold unit 102. The pull-up unit 101 is connected with the ultrasonic sensing unit 30 and the first signal terminal Vbias1, and the pull-up unit 101 is configured to superpose the electric signal output from the ultrasonic sensing unit 30 on a second potential under the control of the first signal terminal Vbias1 to cause a trough potential of the electric signal to be at the second potential. The potential hold unit 102 is connected with the pull-up unit 101, and the potential hold unit 102 is configured to generate the detection voltage according to an electrical signal superposed on the second potential, herein the detection voltage is a sum of the second potential and a peak-to-peak value of the electrical signal, and the second potential is higher than a first potential.

It needs to be noted that the peak-to-peak value of the electrical signal may be a difference value obtained by subtracting a trough value of the electrical signal from a peak value of the electrical signal. For example, the electrical signal output from the ultrasonic sensing unit 30 may be a sinusoidal electrical signal.

It should be understood that in the first detection stage, the pull-up unit 101 superposes the electrical signal, i.e., a sine wave signal, output from the ultrasonic sensing unit 30 on the second potential under the control of the first signal terminal Vbias1, and further, the potential hold unit 102 generates the detection voltage according to the electrical signal superposed on the second potential, and then, in the second detection stage, the output module 20 generates the output signal according to the detection voltage generated by the potential hold unit 102 and provides the output signal to the read line RL.

It needs to be further noted that in this implementation, when superposing the sine wave signal on the second potential, the sine wave signal is translated as a whole to make the trough of the sine wave signal be positioned at the second potential.

Further, according to an implementation of the present disclosure, as shown in FIGS. 5-6, the ultrasonic sensor pixel circuit further includes an ultrasonic transmission control module 40 connected with the ultrasonic sensing unit 30 and a transmission control terminal IN, and the ultrasonic transmission control module 40 provides a first potential to the ultrasonic sensing unit 30 under control of the transmission control terminal IN.

It needs to be noted that the first potential is a low level potential. Specifically, the ultrasonic transmission control module 40 may be connected with the second electrode RX of the ultrasonic sensing unit 30, and the ultrasonic transmission control module 40 provides the first potential, i.e., the low level potential, to the second electrode RX of the ultrasonic sensing unit 30 under the control of the transmission control terminal IN.

It should be understood that before the first detection stage, an ultrasonic transmission stage is further included. In the ultrasonic transmission stage, the ultrasonic transmission control module 40 provides the first potential, i.e., the low level potential, to the ultrasonic sensing unit 30, specifically, to the second electrode RX of the ultrasonic sensing unit 30 under the control of the transmission control terminal IN, so that the second electrode RX of the ultrasonic sensing unit 30 is kept at a fixed potential.

Further, according to an implementation of the present disclosure, as shown in FIGS. 5-6, the ultrasonic sensor pixel circuit further includes a reset module 50 connected with a third terminal of the detection module 10 and a reset terminal RESET, and the reset module 50 sets the third terminal of the detection module 10 to the second potential under control of the reset terminal RESET.

It should be understood that after the second detection stage, a reset stage is further included. In the reset stage, the reset module 50 sets the third terminal of the detection module 10 to the second potential under the control of the reset terminal RESET to reset the third terminal of the detection module 10, herein the third terminal of the detection module 10 is configured to provide the detection voltage.

A structure and principle of an ultrasonic sensor pixel circuit according to an implementation of the present disclosure will be described below with reference to FIGS. 7 and 8.

Figure 7:
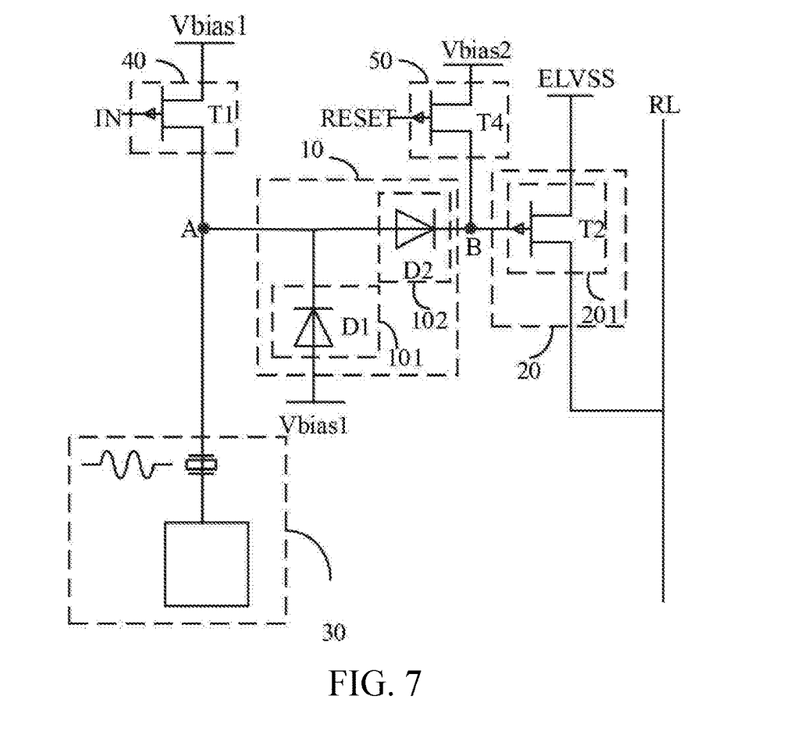
FIG. 7 is a schematic circuit diagram of an ultrasonic sensor pixel circuit according to an implementation of the present disclosure.
Figure 8:
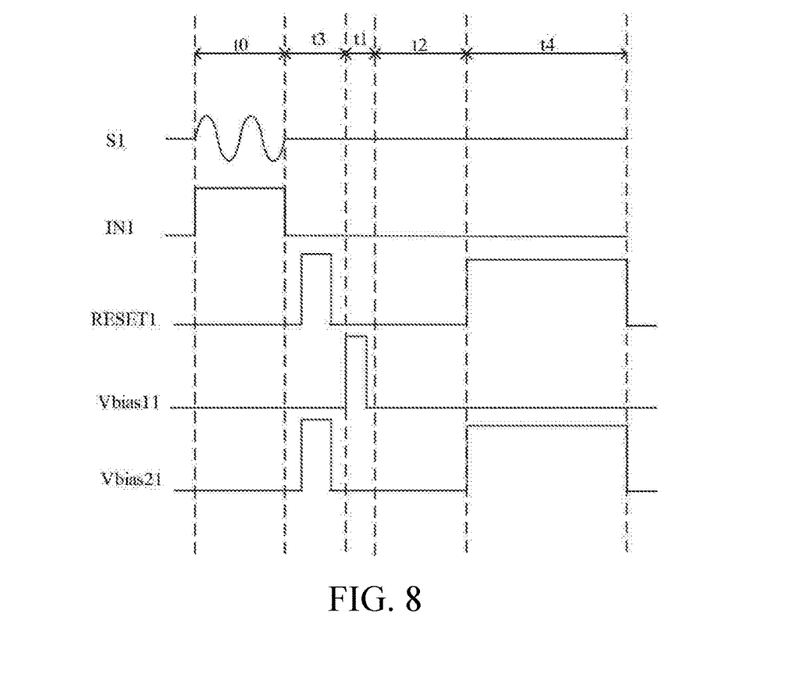
FIG. 8 is a schematic diagram of control timing of an ultrasonic sensor pixel circuit according to an implementation of the present disclosure.

According to an implementation of the present disclosure, as shown in FIG. 7, the pull-up unit 101 includes a first diode D1, an anode of the first diode D1 is connected with the first signal terminal Vbias1, and a cathode of the first diode D1 is connected with the ultrasonic sensing unit 30.

According to an implementation of the present disclosure, as shown in FIG. 7, the potential hold unit 102 includes a second diode D2, an anode of the second diode D2 is connected with the cathode of the first diode D1, and a cathode of the second diode D2 serves as the third terminal of the detection module 10.

According to an implementation of the present disclosure, as shown in FIG. 7, the ultrasonic transmission control module 40 includes a first transistor T1. A first electrode of the first transistor T1 is connected with the ultrasonic sensing unit 30, a second electrode of the first transistor T1 is connected with the first signal terminal Vbias1, and a control electrode of the first transistor T1 is connected with the transmission control terminal IN.

It needs to be noted that the first transistor T1 may be a reset transistor.

According to an implementation of the present disclosure, as shown in FIG. 7, the output module 20 includes a driving unit 201 that generates an output signal according to a detection voltage, herein the driving unit 201 includes a second transistor T2. A first electrode of the second transistor T2 is connected with a first power supply ELVSS, a second electrode of the second transistor T2 is connected with the read line RL, and a control electrode of the second transistor T2 is connected with the third terminal of the detection module 10.

It should be understood that the driving unit 201 may directly provide the generated output signal to the read line RL to realize ultrasonic fingerprint recognition.

It needs to be noted that the second transistor T2 may be a gate-voltage controlled device, and a specific type is determined by a type of an external detection circuit connected with the read line RL. If the external detection circuit is a current type detection circuit, the second transistor T2 is a gate-voltage controlled current device, and if the external detection circuit is a voltage type detection circuit, the second transistor T2 is a source follower. Taking the second transistor T2 as the gate-voltage controlled current device as an example herein, an output signal generated by the output module 20 according to the detection voltage may be a current signal capable of representing a full magnitude of an amplitude of an echo signal fed back by the finger, thus the full magnitude of the ultrasonic echo signal may be detected, and further precision of ultrasonic fingerprint recognition may be improved.

According to an implementation of the present disclosure, as shown in FIG. 7, the reset module 50 includes a fourth transistor T4. A first electrode of the fourth transistor T4 is connected with a second signal terminal Vbias2, a second electrode of the fourth transistor T4 is connected with the third terminal of the detection module 10, and a control electrode of the fourth transistor T4 is connected with the reset terminal RESET.

It needs to be noted that the fourth transistor T4 may be a reset transistor.

It should be understood that in the reset stage, under the control of the reset terminal RESET, the fourth transistor T4 is turned on, so that a voltage signal input from the second signal terminal Vbias2, such as the second potential, is written into the third terminal of the detection module 10, thereby the third terminal of the detection module 10 is set as the second potential to reset the third terminal of the detection module 10.

It needs to be further noted that the first transistor T1, the second transistor T2 and the fourth transistor T4 may be NPN type transistors or PNP type transistors. Herein, the NPN type transistor is a N type transistor which is turned on at a high level, and the PNP type transistor is a P type transistor which is turned on at a low level. The ultrasonic sensor pixel circuit according to the implementation of the present disclosure will be described by taking the first transistor T1, the second transistor T2 and the fourth transistor T4 being NPN transistors as an example.

In addition, in an implementation of the present disclosure, a third detection stage is included before the first detection stage. In the third detection stage, under control of the reset terminal RESET, the fourth transistor T4 is turned on, so that a voltage signal input from the second signal terminal Vbias2, such as the second potential, is written into the third terminal of the detection module 10, thereby the third terminal of the detection module 10 is set as the second potential.

Referring to a timing diagram of FIG. 8, a working principle of an implementation of FIG. 7 is as follows.

Herein, S1 may be a driving signal provided to the first electrode (cathode) in the ultrasonic sensing unit 30, IN1 may be an input signal of the transmission control terminal IN, RESET1 may be an input signal of the reset terminal RESET, Vbias11 may be an input signal of the first signal terminal Vbias1, and Vbias21 may be an input signal of the second signal terminal Vbias2.

In an ultrasonic transmission stage t0, a driving signal S1 provided to the first electrode TX in the ultrasonic sensing unit 30 is a sine wave signal, while the transmission control terminal IN inputs a high level signal, the first transistor T1 is turned on, and a first potential, i.e., a low level potential, input from the first signal terminal Vbias1 is provided to the ultrasonic sensing unit 30, specifically, to the second electrode RX in the ultrasonic sensing unit 30, so that the second electrode RX is kept at a fixed potential. At this time, the piezoelectric component in the ultrasonic sensing unit 30 generates an inverse piezoelectric effect to transmit ultrasonic waves outwards due to voltage excitation.

After ending of the ultrasonic transmission stage t0, the sine wave signal is stop being provided to the first electrode TX in the ultrasonic sensing unit 30, i.e., the driving signal S1 is changed to be a fixed level. At this time, reflection occurs when transmitted waves contact an object such as a finger, and then the piezoelectric component in the ultrasonic sensing unit 30 is affected by echoes fed back by the finger, and an alternating current signal is generated on the second electrode RX due to the positive piezoelectric effect, i.e., an alternating current signal is generated at point A. At the same time, the transmission control terminal IN inputs a low level signal, the first transistor T1 is turned off, and a trough potential of the alternating current signal generated at point A is determined by the potential of the first signal terminal Vbias1.

In a third detection stage t3, a potential of the second signal terminal Vbias2 is changed to the second potential. It needs to be noted that the potential of the second signal terminal Vbias2 may be changed to the second potential after a time length from a time point when the transmission control terminal IN is changed to the low level signal reaches a first preset time length. The second potential may be a quiescent operation point of the second transistor T2, the reset terminal RESET inputs a high level signal, the fourth transistor T4 is turned on, and the input signal of the second signal terminal Vbias2, i.e., the second potential, is written into the third terminal of the detection module 10, i.e., the cathode of the second diode D2, to make point B be at the quiescent operation point of the second transistor T2. After that, the reset terminal RESET is pulled down, and the fourth transistor T4 is turned off.

In a first detection stage t1, the potential of the first signal terminal Vbias1 is pulled up. It needs to be noted that the potential of the first signal terminal Vbias1 may be pulled up after a time length from a time point when the rest terminal RESET is changed to a low level signal reaches a second preset time length, to make the potential of the first signal terminal Vbias1 be at the second potential. At this time, due to action of the first diode D1, the sinusoidal electrical signal at point A is superposed on the second potential to make the trough potential of the sinusoidal electrical signal be at the second potential, that is, a potential at point A is raised above the quiescent operation point of the second transistor T2, and then the potential of the first signal terminal Vbias1 is pulled down to prevent current leakage. At this time, point B may hold a peak-to-peak value of the sinusoidal electrical signal due to action of the second diode D2.

It should be understood that based on characteristics of a diode, when an anode potential of the diode is higher than a cathode potential, the diode is turned on to make the cathode potential of the diode be basically the same as the anode potential, while when the anode potential of the diode is lower than the cathode potential, the diode is turned off, the cathode potential of the diode may remain unchanged, and does not decrease with decrease of the anode potential. Thus, when a peak value of the sinusoidal electrical signal at point A is provided to the anode of the second diode D2, the cathode potential of the second diode D2 is raised to a sum of the second potential and a peak-to-peak value of the sinusoidal electrical signal at point A, that is, the potential at point B may be raised to the sum of the second potential and the peak-to-peak value of the sinusoidal electrical signal at point A, and then the potential at point B is kept at this potential, that is, the detection voltage.

In a second detection stage t2, the second transistor T2 generates an output signal, i.e., a current signal, according to the detection voltage at point B, and provides the output signal, i.e., the current signal, to the read line RL, so that the external detection circuit may determine the peak-to-peak value of the sinusoidal signal according to the output signal, and further determine valleys or ridges of the finger fingerprint, thereby realizing high-precision ultrasonic fingerprint recognition.

In a reset stage t4, the input signal of the second signal terminal Vbias2 is changed to the second potential, the reset terminal RESET inputs a high level signal, the fourth transistor T4 is turned on, and the input signal of the second signal terminal Vbias2, i.e., the second potential, is written into the third terminal of the detection module 10, i.e., the cathode of the second diode D2, to reset the point B.

A structure and principle of an ultrasonic sensor pixel circuit according to another implementation of the present disclosure will be described below with reference to FIGS. 9 and 10.

Figure 9:
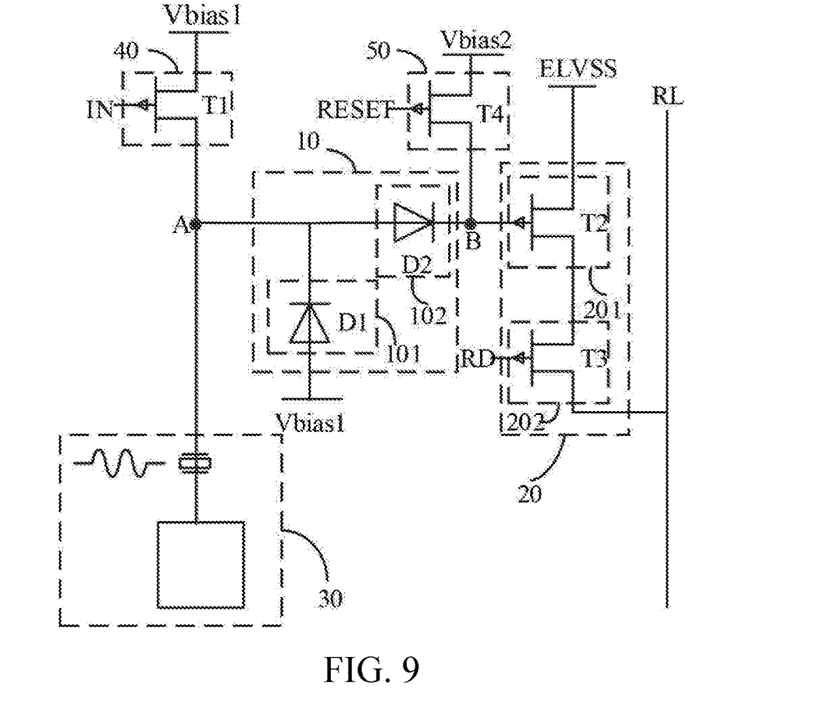
FIG. 9 is a schematic circuit diagram of an ultrasonic sensor pixel circuit according to another implementation of the present disclosure.
Figure 10:
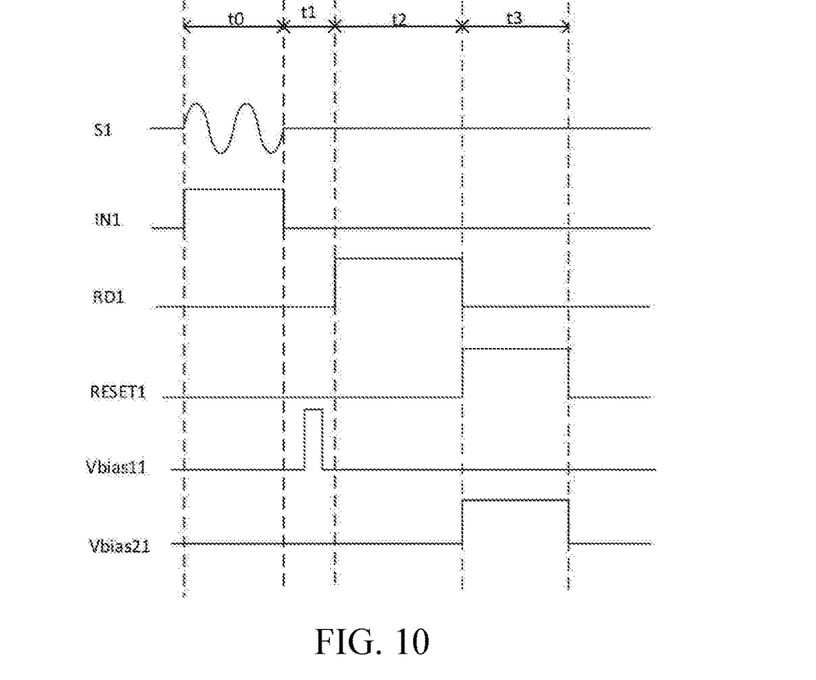
FIG. 10 is a schematic diagram of control timing of an ultrasonic sensor pixel circuit according to another implementation of the present disclosure.

The structure of the ultrasonic sensor pixel circuit of the implementation of FIG. 9 differs from that of the implementation of FIG. 7 in that the output module 20 includes a read unit 202 in addition to the driving unit 201. As shown in FIG. 9, the output module 20 further includes the read unit 202 located between and connected with the driving unit 201 and the read line RL, and the read unit 202 is also connected with a read terminal RD. The read unit 202 is configured to provide an output signal to the read line RL under control of the read terminal RD. Herein, the read unit 202 includes a third transistor T3, a first electrode of the third transistor T3 is connected with the second electrode of the second transistor T2, a second electrode of the third transistor T3 is connected with the read line RL, and a control electrode of the third transistor T3 is connected with the read terminal RD.

It should be understood that the read unit 202 may provide the output signal to the read line RL under the control of the read terminal RD to realize ultrasonic fingerprint recognition.

It needs to be noted that the third transistor T3 may be a gating transistor for gating of row read. In the implementation of the present disclosure, a row-column read mode is adopted, that is, when a row gating is turned on, a read line RL corresponding to each column reads signals, after the present row read is finished, a third transistor T3 for a next row is turned on, and so on.

Referring to a timing diagram of FIG. 10, a working principle of an implementation of FIG. 9 is as follows.

Herein, S1 may be a driving signal provided to a first electrode (cathode) in the ultrasonic sensing unit 30, IN1 may be an input signal of the transmission control terminal IN, RD1 may be an input signal of the read terminal RD, RESET1 may be an input signal of the reset terminal RESET, Vbias11 may be an input signal of the first signal terminal Vbias1, and Vbias21 may be an input signal of the second signal terminal Vbias2.

In an ultrasonic transmission stage t0, a driving signal S1 provided to the first electrode TX in the ultrasonic sensing unit 30 is a sine wave signal, while the transmission control terminal IN inputs a high level signal, the first transistor T1 is turned on, and a first potential, i.e., a low level potential, input from the first signal terminal Vbias1 is provided to the ultrasonic sensing unit 30, specifically, to the second electrode RX in the ultrasonic sensing unit 30 to make the second electrode RX keep at a fixed potential. At this time, the piezoelectric component in the ultrasonic sensing unit 30 generates an inverse piezoelectric effect to transmit ultrasonic waves outwards due to voltage excitation.

After ending of the ultrasonic transmission stage t0, the sine wave signal is stopped being provided to the first electrode TX in the ultrasonic sensing unit 30, i.e., the driving signal S1 is changed to a fixed level. At this time, reflection occurs when transmitted waves contact an object such as a finger, the piezoelectric component in the ultrasonic sensing unit 30 is affected by echoes fed back by the finger, and an alternating current signal is generated on the second electrode RX due to the positive piezoelectric effect, i.e., an alternating current signal is generated at point A. At the same time, the transmission control terminal IN inputs a low level signal, the first transistor T1 is turned off, and a trough potential of the alternating current signal generated at point A is determined by a potential of the first signal terminal Vbias1.

In a first detection stage t1, the potential of the first signal terminal Vbias1 is pulled up after a preset time length is delayed, to make the potential of the first signal terminal Vbias1 at a second potential. At this time, due to action of the first diode D1, the sinusoidal electrical signal at point A is superposed on the second potential to make the trough potential of the sinusoidal electrical signal be at the second potential, that is, the potential at point A is raised above a quiescent operation point of the second transistor T2, herein, the second potential may be the quiescent operation point of the second transistor T2, and then the potential of the first signal terminal Vbias1 is pulled down to prevent current leakage. At this time, point B may hold a peak-to-peak value of the sinusoidal electrical signal due to action of the second diode D2.

It should be understood that based on characteristics of a diode, when an anode potential of the diode is higher than a cathode potential, the diode is turned on to make the cathode potential of the diode be basically the same as the anode potential, while when the anode potential of the diode is lower than the cathode potential, the diode is turned off, the cathode potential of the diode may remain unchanged, and does not decrease with decrease of the anode potential. Thus, when a peak value of the sinusoidal electrical signal at point A is provided to the anode of the second diode D2, the cathode potential of the second diode D2 is raised to a sum of the second potential and a peak-to-peak value of the sinusoidal electrical signal at point A, that is, the potential at point B may be raised to the sum of the second potential and the peak-to-peak value of the sinusoidal electrical signal at point A, and then the potential at point B is kept at this potential, that is, the detection voltage.

It should be noted that since the ultrasonic sensing unit 30 is arranged inside the display panel, transmitted waves contact other objects such as the display screen before contacting a finger, thereby the piezoelectric component in the ultrasonic sensing unit 30 is further affected by echoes fed back from the display screen before affected by the echoes fed back from the finger, and an alternating current signal is generated on the second electrode RX due to the positive piezoelectric effect, i.e., an alternating current signal is generated at point A. Therefore, the potential of the first signal terminal Vbias1 needs to be pulled up after the preset time length is delayed, to ensure that the alternating current signal at point A at this time is generated according to the echo signals fed back by the finger, thus making the ultrasonic fingerprint recognition more precise.

The preset time length may be determined according to time when the echo signals fed back by the finger are received by the ultrasonic sensing unit 30.

In a second detection stage t2, the second transistor T2 generates an output signal, i.e., a current signal, according to the detection voltage at point B, the read terminal RD inputs a high level signal, the third transistor T3 is turned on, and provides the output signal, i.e., the current signal, to the read line RL, so that the external detection circuit may determine a peak-to-peak value of the sine wave signal according to the output signal, and further determine valleys or ridges of the finger fingerprint, thereby realizing high-precision ultrasonic fingerprint recognition.

In a reset stage t3, the input signal of the second signal terminal Vbias2 is changed to the second potential, the reset terminal RESET inputs a high level signal, the fourth transistor T4 is turned on, and the input signal of the second signal terminal Vbias2, i.e., the second potential, is written into the third terminal of the detection module 10, i.e., the cathode of the second diode D2, to reset the point B.

To sum up, according to the ultrasonic sensor pixel circuit provided in the implementation of the present disclosure, the detection module generates the detection voltage according to the electrical signal output from the ultrasonic sensing unit under the control of the first signal terminal, and then the output module generates the output signal according to the detection voltage and provides the output signal to the read line. Therefore, the ultrasonic sensor pixel circuit of the implementation of the present disclosure can detect the peak-to-peak value of the echo signal, fed back by the finger, of the ultrasonic wave, realize the detection of the full amplitude of the ultrasonic echo signal, and further improve precision of the fingerprint recognition.

Based on the ultrasonic sensor pixel circuit in the above-mentioned implementations, an implementation of the present disclosure further provides a display panel including the above-mentioned ultrasonic sensor pixel circuit.

According to an implementation of the present disclosure, a plurality of ultrasonic sensor pixel circuits are integrated and arranged in a pixel circuit layer of the display panel, or a plurality of ultrasonic sensor pixel circuits are arranged below the pixel circuit layer of the display panel.

According to the display panel provided by the implementation of the disclosure, the arranged ultrasonic sensor pixel circuit can detect a peak-to-peak value of an echo signal, fed back by the finger, of the ultrasonic wave, realize detection of a full amplitude of the ultrasonic echo signal, and further improve precision of the fingerprint recognition.

Based on the ultrasonic sensor pixel circuit in the above-mentioned implementations, an implementation of the present disclosure further provides a driving method of an ultrasonic sensor pixel circuit.

Figure 11:
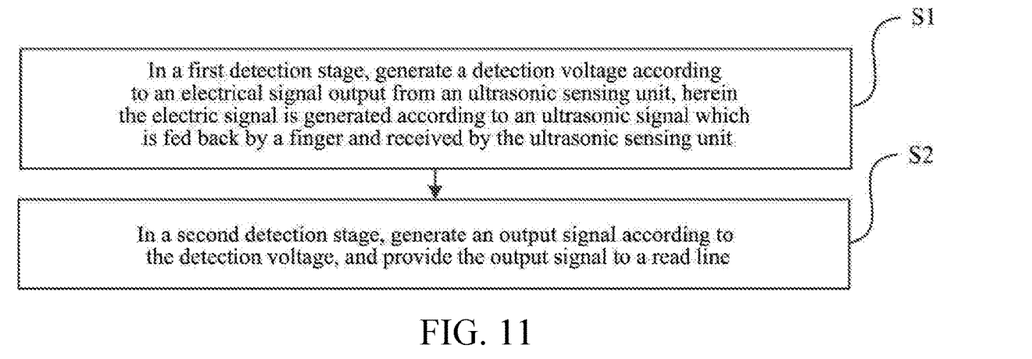
FIG. 11 is a schematic flowchart of a driving method of an ultrasonic sensor pixel circuit according to an implementation of the present disclosure.

FIG. 11 is a schematic flowchart of a driving method of an ultrasonic sensor pixel circuit according to an implementation of the present disclosure. As shown in FIG. 11, the driving method of the ultrasonic sensor pixel circuit according to the implementation of the present disclosure includes the following acts S1-S2.

In S1, in a first detection stage, a detection voltage is generated according to an electrical signal output from an ultrasonic sensing unit, herein the electric signal is generated according to an ultrasonic signal which is fed back by a finger and received by the ultrasonic sensing unit.

In S2, in a second detection stage, an output signal is generated according to the detection voltage, and is provided to a read line.

According to an implementation of the present disclosure, before the first detection stage, the method further includes: in an ultrasonic transmission stage, a first potential is provided to the ultrasonic sensing unit; and after the second detection stage, the method further includes: in a reset stage, a third terminal of a detection module is set as a second potential, herein the third terminal of the detection module is configured to provide the detection voltage.

According to an implementation of the present disclosure, before the first detection stage, the method further includes: in a third detection stage, a third terminal of a detection module is set as a second potential, herein the third terminal of the detection module is configured to provide the detection voltage.

As described above, corresponding to the ultrasonic sensor pixel circuits of the above implementations, the driving method of the ultrasonic sensor pixel circuit of the implementation of the present disclosure may also be classified as two types.

Figure 12:
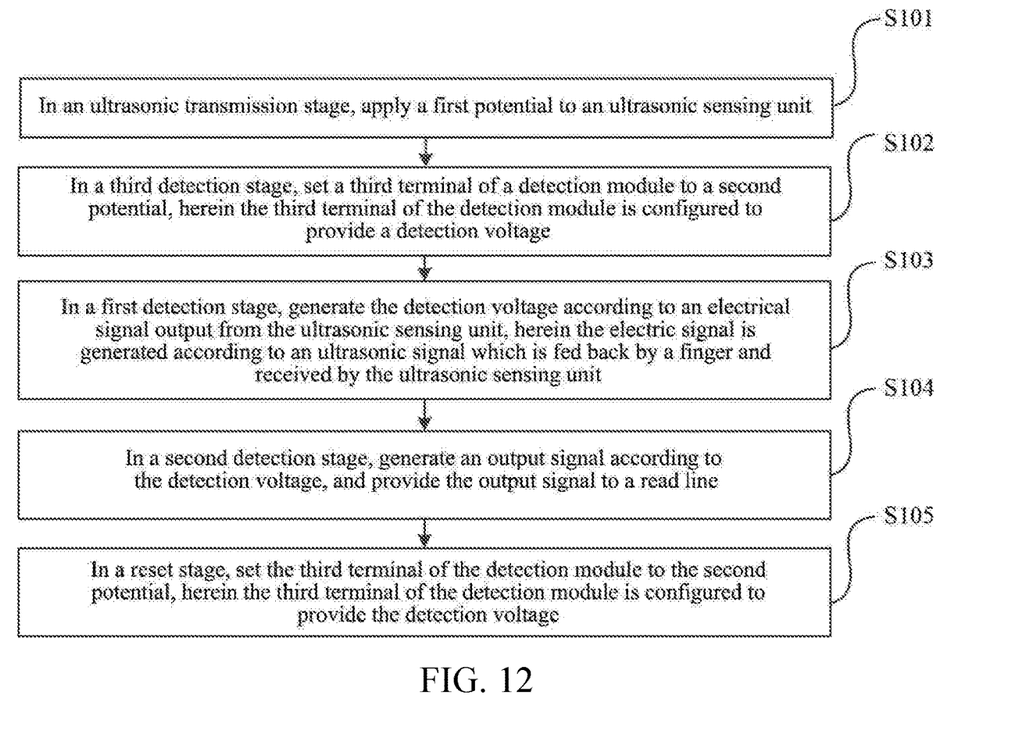
FIG. 12 is a schematic flowchart of a driving method of an ultrasonic sensor pixel circuit according to a specific implementation of the present disclosure.

As shown in FIG. 12, a driving method of an ultrasonic sensor pixel circuit corresponding to the implementation of FIG. 7 includes the following acts S101-S105.

In S101, in an ultrasonic transmission stage, a first potential is provided to an ultrasonic sensing unit.

In S102, in a third detection stage, a third terminal of a detection module is set as a second potential, herein the third terminal of the detection module is configured to provide a detection voltage.

In S103, in a first detection stage, the detection voltage is generated according to an electrical signal output from the ultrasonic sensing unit, herein the electric signal is generated according to an ultrasonic signal which is fed back by a finger and received by the ultrasonic sensing unit.

In S104, in a second detection stage, an output signal is generated according to the detection voltage, and is provided to a read line.

In S105, in a reset stage, the third terminal of the detection module is set as the second potential, herein the third terminal of the detection module is configured to provide the detection voltage.

Figure 13:
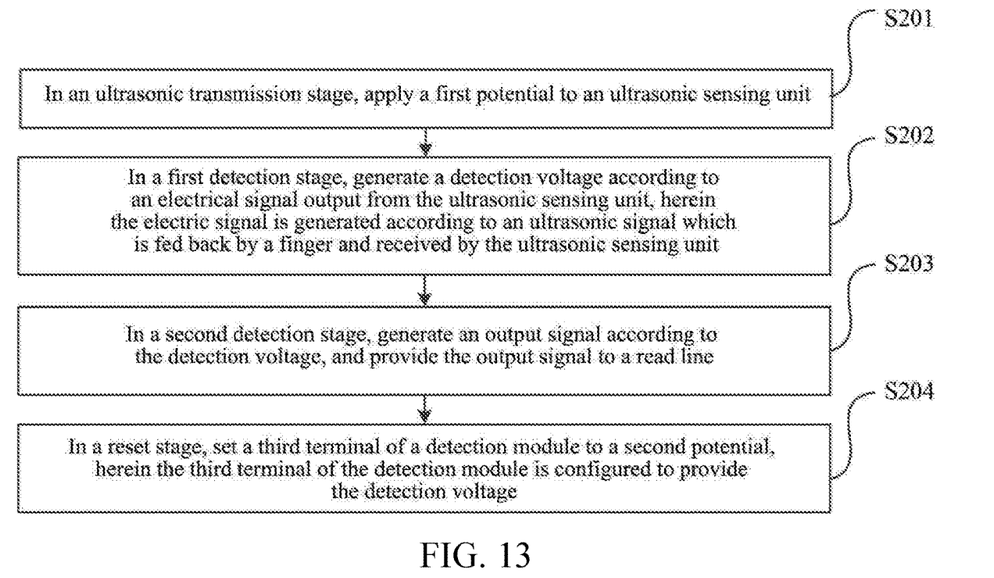
FIG. 13 is a schematic flowchart of a driving method of an ultrasonic sensor pixel circuit according to another specific implementation of the present disclosure.

As shown in FIG. 13, a driving method of an ultrasonic sensor pixel circuit corresponding to the implementation of FIG. 9 includes the following acts S201-S204.

In S201, in an ultrasonic transmission stage, a first potential is provided to an ultrasonic sensing unit.

In S202, in a first detection stage, a detection voltage is generated according to an electrical signal output from the ultrasonic sensing unit, herein the electric signal is generated according to an ultrasonic signal which is fed back by a finger and received by the ultrasonic sensing unit.

In S203, in a second detection stage, an output signal is generated according to the detection voltage, and is provided to a read line.

In S204, in a reset stage, a third terminal of a detection module is set as a second potential, herein the third terminal of the detection module is configured to provide the detection voltage.

To sum up, according to the driving method of the ultrasonic sensor pixel circuit provided in the implementation of the present disclosure, first the detection voltage is generated according to the electrical signal output from the ultrasonic sensing unit, and then the output signal is generated according to the detection voltage and is provided to the read line. Therefore, in the driving method of the ultrasonic sensor pixel circuit of the implementation of the present disclosure, a peak-to-peak value of an echo signal, fed back by the finger, of the ultrasonic wave can be detected to realize a detection of a full amplitude of the ultrasonic echo signal, and thereby precision of fingerprint recognition is improved.

In the description of the specification, reference terms "an implementation," "some implementations," "an example," "a specific example," or "some examples," refers that a particular feature, structure, material, or characteristic described in connection with the implementation or example is included in at least one implementation or example of the present disclosure. In this specification, the schematic representation of the above-mentioned terms is not necessarily directed to the same implementation or example. Moreover, the specific feature, structure, material, or characteristic described may be combined in any one or more implementations or examples in a proper way. In addition, those skilled in the art may incorporate and combine different implementations or examples and features of different implementations or examples described in this specification if there is no conflict.

In addition, the terms "first" and "second" are used for description purposes only, and cannot be interpreted as indicating or implying relative importance or implicitly indicating a number of technical features referred to. Thus, the features defined with "first" and "second" may include at least one of the features explicitly or implicitly. In the description of the present disclosure, "a plurality of" refers to at least two, for example, two or three, unless specified otherwise.

Any process or method description in the flowchart or otherwise described herein may be understood as representing a module, segment, or portion of codes that include one or more executable instructions for implementing customized logical functions or steps of the process, and the scope of preferred implementations of the present disclosure includes other implementations in which functions may be performed in an order which is not shown or discussed. Other implementations include an implementation in which the functions involved are performed in a substantially simultaneous manner or in a reverse order. The above should be understood by those skilled in the art to which implementations of the present disclosure belong.

The logic and/or acts represented in the flowchart or otherwise described herein, for example, may be considered as a fixed sequence table of executable instructions for implementing logical functions, and may be embodied in any computer readable medium for use by or in connection with an instruction execution system, apparatus, or device (e.g., a computer-based system, a system including a processor, or other systems that can fetch and execute instructions from an instruction execution system, apparatus, or device). For the purposes of this specification, "computer readable medium" may be any equipment that may contain, store, communicate, propagate, or transport the program for use by or in connection with the instruction execution system, apparatus, or device. More specific examples (non-exhaustive list) of computer readable medium include the following: an electrical connection part (electronic apparatus) having one or more wires, a portable computer disk cartridge (magnetic apparatus), a random access memory (RAM), a read only memory (ROM), an erasable programmable read only memory (EPROM or flash memory), an optical fiber apparatus, and a portable compact disk read only memory (CDROM). In addition, the computer readable medium may even be paper or other suitable medium on which the program may be printed, because the program may be electronically obtained, for example, by optically scanning the paper or other medium, followed by editing, interpreting, or processing in other suitable ways if necessary, and then the program may be stored in a computer memory.

It should be understood that various parts of the present disclosure may be implemented in hardware, software, firmware, or a combination thereof. In the above implementations, multiple acts or methods may be implemented through software or firmware stored in a memory and executed by a suitable instruction execution system. For example, if the multiple acts or methods are implemented through hardware as same as those in another implementation, any one or a combination of the following technologies known in the art may be adopted: discrete logic circuits having logic gates for implementing logic functions on data signals, application-specific integrated circuits having appropriate combinational logic gates, programmable gate arrays (PGA), field programmable gate arrays (FPGA), etc.

One of ordinary skill in the art can understand that all or part of the acts carried by the methods for implementing the above implementations may be completed by instructing relevant hardware through a program, which may be stored in a computer readable storage medium, and the program, when executed, includes one of the acts of the method implementations or a combination thereof.

In addition, various functional units in various implementations of the present disclosure may be integrated into one processing module, or various units may exist physically and separately, or two or more units may be integrated into one module. The above integrated modules may be implemented in a form of hardware or software functional modules. If the integrated module is implemented in the form of software functional modules and sold or used as an independent product, it may also be stored in a computer readable storage medium.

The storage medium mentioned above may be a read-only memory, a magnetic disk or an optical disk, etc. Although implementations of present disclosure have been shown and described above, it should be understood that above implementations are just explanatory, and cannot be construed to limit the present disclosure. For those skilled in the art, changes, alternatives, and modifications may be made to the implementations without departing from spirit, principles and scope of the present disclosure.

What we claim is:

1. An ultrasonic sensor pixel circuit, comprising:
    a detection module, wherein a first terminal of the detection module is connected with an ultrasonic sensing unit, a second terminal of the detection module is connected with a first signal terminal, and the detection module is configured to generate a detection voltage according to an electric signal output from the ultrasonic sensing unit under control of the first signal terminal; and
    an output module, wherein a first terminal of the output module is connected with a third terminal of the detection module, a second terminal of the output module is connected with a read line, and the output module is configured to generate an output signal according to the detection voltage and provide the output signal to the read line;
    wherein the detection module comprises:
    a pull-up unit, wherein the pull-up unit is connected with the ultrasonic sensing unit and the first signal terminal, and the pull-up unit is configured to superpose the electric signal output from the ultrasonic sensing unit on a second potential under the control of the first signal terminal, to enable a trough potential of the electric signal to be at the second potential; and
    a potential hold unit, wherein the potential hold unit is connected with the pull-up unit, the potential hold unit is configured to generate the detection voltage according to an electrical signal superposed on the second potential, wherein the detection voltage is a sum of the second potential and a peak-to-peak value of the electrical signal.

2. The ultrasonic sensor pixel circuit according to claim 1, wherein the pull-up unit comprises a first diode, an anode of the first diode is connected with the first signal terminal, and a cathode of the first diode is connected with the ultrasonic sensing unit.

3. The ultrasonic sensor pixel circuit according to claim 2, wherein the potential hold unit comprises a second diode, an anode of the second diode is connected with the cathode of the first diode, and a cathode of the second diode serves as the third terminal of the detection module.

4. The ultrasonic sensor pixel circuit according to claim 1, further comprising:
    an ultrasonic transmission control module connected with the ultrasonic sensing unit and a transmission control terminal, wherein the ultrasonic transmission control module provides a first potential to the ultrasonic sensing unit under control of the transmission control terminal.

5. The ultrasonic sensor pixel circuit according to claim 4, wherein the ultrasonic transmission control module comprises:
   a first transistor, wherein a first electrode of the first transistor is connected with the ultrasonic sensing unit, a second electrode of the first transistor is connected with the first signal terminal, and a control electrode of the first transistor is connected with the transmission control terminal.

6. A display panel comprising the ultrasonic sensor pixel circuit according to claim 4.

7. The ultrasonic sensor pixel circuit according to claim 1, further comprising:
   a reset module connected with the third terminal of the detection module and a reset terminal, wherein the reset module sets the third terminal of the detection module to a second potential under control of the reset terminal.

8. The ultrasonic sensor pixel circuit according to claim 7, wherein the reset module comprises:
   a fourth transistor, wherein a first electrode of the fourth transistor is connected with a second signal terminal, a second electrode of the fourth transistor is connected with the third terminal of the detection module, and a control electrode of the fourth transistor is connected with the reset terminal.

9. A display panel comprising the ultrasonic sensor pixel circuit according to claim 7.

10. The ultrasonic sensor pixel circuit according to claim 1, wherein the output module comprises a driving unit that generates the output signal according to the detection voltage, wherein,
   the driving unit comprises a second transistor, a first electrode of the second transistor is connected with a first power supply, a second electrode of the second transistor is connected with the read line, and a control electrode of the second transistor is connected with the third terminal of the detection module.

11. The ultrasonic sensor pixel circuit according to claim 10, wherein the output module further comprises a read unit located between and connected with the driving unit and the read line, the read unit is further connected with a read terminal, and the read unit is configured to provide the output signal to the read line under control of the read terminal, wherein,
   the read unit comprises a third transistor, a first electrode of the third transistor is connected with the second electrode of the second transistor, a second electrode of the third transistor is connected with the read line, and a control electrode of the third transistor is connected with the read terminal.

12. A display panel comprising the ultrasonic sensor pixel circuit according to claim 10.

13. A display panel comprising the ultrasonic sensor pixel circuit according to claim 1.

14. The display panel according to claim 13, wherein the plurality of ultrasonic sensor pixel circuits are integrated and arranged in a pixel circuit layer of the display panel, or the plurality of ultrasonic sensor pixel circuits are arranged below the pixel circuit layer of the display panel.

15. A driving method of the ultrasonic sensor pixel circuit according to claim 1, comprising the following acts:
   in a first detection stage, generating a detection voltage according to an electrical signal output from an ultrasonic sensing unit; and
   in a second detection stage, generating an output signal according to the detection voltage, and providing the output signal to a read line.

16. The driving method of the ultrasonic sensor pixel circuit according to claim 15, wherein before the first detection stage, the method further comprises:
   in a third detection stage, setting a third terminal of a detection module to a second potential, wherein the third terminal of the detection module is configured to provide the detection voltage.

17. The driving method of the ultrasonic sensor pixel circuit according to claim 16, wherein,
   before the first detection stage, the method further comprises:
   in an ultrasonic transmission stage, providing a first potential to the ultrasonic sensing unit;
   after the second detection stage, the method further comprises:
   in a reset stage, setting the third terminal of the detection module to a second potential, wherein the third terminal of the detection module is configured to provide the detection voltage.

18. The driving method of the ultrasonic sensor pixel circuit according to claim 15, wherein,
   before the first detection stage, the method further comprises:
   in an ultrasonic transmission stage, providing a first potential to the ultrasonic sensing unit;
   after the second detection stage, the method further comprises:
   in a reset stage, setting the third terminal of the detection module to a second potential, wherein the third terminal of the detection module is configured to provide the detection voltage.

* * * * *